March 30, 1965   E. E. GOODALE   3,176,223
UNIDIRECTIONAL CURRENT MEASURING CIRCUIT USING
A CONTROLLED FIRING RELAXATION OSCILLATOR
Filed March 30, 1961
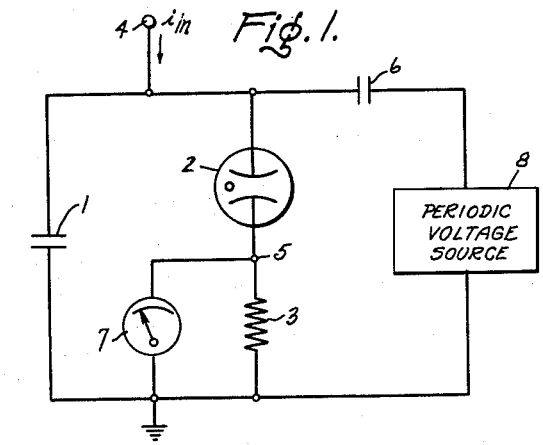
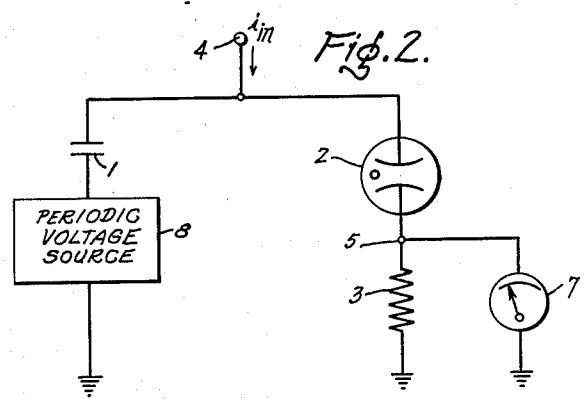
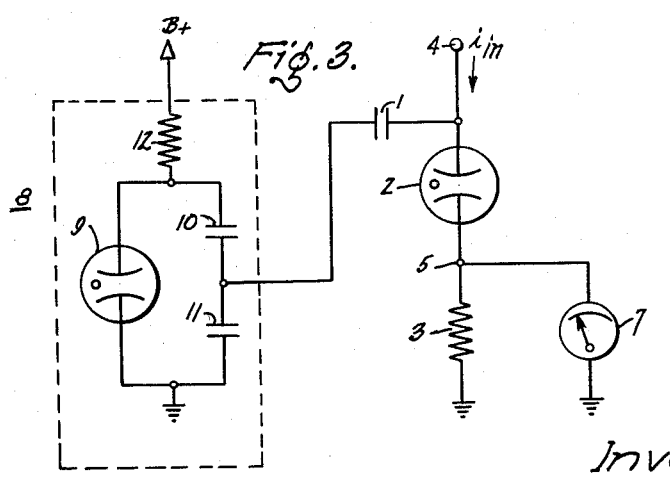
Inventor
Edmund E. Goodale
by Paul A. Frank
His Attorney

United States Patent Office 3,176,223
Patented Mar. 30, 1965

3,176,223
UNIDIRECTIONAL CURRENT MEASURING CIRCUIT USING A CONTROLLED FIRING RELAXATION OSCILLATOR
Edmund E. Goodale, Scotia, N.Y., assignor to General Electric Company, a corporation of New York
Filed Mar. 30, 1961, Ser. No. 99,521
8 Claims. (Cl. 324—122)

This invention relates to current measuring circuits and, more particularly, to a circuit for measuring minute level current in which the current being measured is converted into a series of pulses, the frequency of which is indicative of the magnitude of the applied current.

It is frequently desirable to have a circuit which is of a simple and lightweight nature and which can be utilized to measure small currents. For example, such a circuit may be used in conjunction with a detector to monitor equipment in satellites. It has been found that the minute currents from such detection equipment can frequently be more readily measured if the current is converted from a direct current to an alternating current. This tends to eliminate many of the problems associated with direct current amplification.

One circuit which has been used in satellite experimentation includes a capacitor in parallel with a series circuit of a neon lamp and a resistor. The current to be measured is applied to this parallel combination and charges the capacitor until the firing voltage of the neon lamp is reached. The neon lamp then conducts, partially discharging the capacitor and sending a current pulse through the resistor. The capacitor discharges until the extinction voltage of the neon lamp is reached and the cycle is then repeated. The voltage across the capacitor thus follows a sawtooth pattern and the voltage across the resistor has the form of a series of spike pulses, the frequency of which is proportional to the magnitude of the input current.

This circuit has been found to exhibit excellent reliability and temperature independence and is extremely lightweight. However, it has been found that the circuit becomes erratic when used to measure currents of an order of magnitude less than $10^{-10}$ amperes. Investigation has shown that, when such small currents are applied, at the time when the capacitor has reached a potential such that the neon lamp should be firing, the lamp, instead of completely firing or discharging, undergoes a series of small discharges or leakage just sufficient to keep the system at or slightly below firing potential. When this occurs, the neon lamp may or may not eventually fire properly and as a result thereof, output pulses occur erratically. In any case, the output pulses become meaningless for currents less than about $5 \times 10^{-11}$ amperes.

It is, accordingly, an object of this invention to provide an improved circuit for measuring currents of small magnitude.

It is another object of this invention to provide an improved circuit for measuring current of small magnitude in which the current being measured is converted into a series of pulses, the frequency of which is indicative of the magnitude of the current being measured.

It is another object of this invention to provide an improved circiut for measuring currents of an order of magnitude of $10^{-12}$ amperes.

Briefly stated, and in accordance with one embodiment of the invention, the current measuring circuit comprises a parallel circuit, one branch of which comprises a capacitance and the other branch of which comprises a series circuit of a neon lamp and a resistance. A periodic voltage source, such as a sawtooth wave generator, is also connected in parallel with the neon lamp. The current to be measured is applied to the parallel circuit. The magnitude of the periodic voltage applied to the neon lamp is sufficient to bring the lamp into full discharge whenever the current being measured charges the capacitor to near the firing potential of the lamp. Circuitry means are provided to measure the frequency of the discharge pulses appearing across the resistance, with this frequency being indicative of the magnitude of the applied current. Such a circuit can accurately measure currents in an order of magnitude of $10^{-12}$ amperes.

For a better understanding of the invention, reference may be had to the accompanying drawings, in which:

FIG. 1 shows a current measuring circuit in accordance with the invention;

FIG. 2 shows another embodiment of a current measuring circuit in accordance with the invention; and FIG. 3 shows the circuit of FIG. 2 with the details of the sawtooth wave generator as connected.

FIG. 1 shows a circuit in accordance with the invention which accurately measures currents of an order of magnitude of $10^{-12}$ amperes. The circuit includes a parallel circuit, one branch of which comprises a charging capacitor 1 and another branch of which comprises a gaseous discharge device, such as a neon tube 2, and a resistance 3. The current to be measured is applied between input terminal 4 and ground. The current being measured charges capacitor 1 until the voltage thereon reaches the discharge potential of lamp 2, at which time lamp 2 discharges capacitor 1 through resistance 3 to provide a spike pulse at the output terminal 5. When capacitor 1 has discharged sufficiently that the voltage thereacross becomes equal to the extinction voltage of lamp 2, the lamp ceases to discharge and the cycle is repeated. Thus, the frequency of discharge of lamp 2 and, accordingly, the frequency of appearance of output pulses at terminal 5 is a measure of the magnitude of the input current. This frequency of output pulses may be measured by any suitable frequency measuring device 7, which may be calibrated in frequency, from which the current may be easily computed, or may be calibrated directly in units of current. In accordance with the invention, a periodic voltage source 8, such as a sawtooth wave generator, a sinusoidal wave generator, or a generator of a train of rectangular pulses, is also connected in parallel with lamp 2. For example, the periodic voltage source 8 may be coupled to lamp 2 through a coupling capacitor 6.

The magnitude of the voltage wave shapes supplied by periodic voltage source 8 should be sufficient to carry lamp 2 into full discharge whenever the voltage on capacitor 1 approaches the firing potential of lamp 2 but should preferably be small relative to the firing potential of lamp 2 so as not to appreciably alter the charging of capacitor 1. Any effect on charging time of capacitor 1 caused by the periodic voltage source 8 will remain constant during operation of the circuit and consequently can be compensated for during calibration of frequency measuring device 7. The periodic frequency of source 8 should preferably be several times greater than the expected frequency of output pulses appearing at terminal 5, although, in practice, it has been found that the circuit will operate satisfactorily with the periodic frequency of source 8 less than twice the maximum expected frequency of the output pulses. Using a periodic source 8 having a sawtooth output of about two volts magnitude at about 200 cycles per second, the circuit shown accurately measures currents of an order of magnitude of $10^{-12}$ amperes, thus measuring currents a full two decades below previously known circuits.

FIG. 2 shows a second embodiment of the invention in which charging capacitor 1 is also utilized to couple the periodic voltage source 8 to neon tube 2. The operation of this embodiment is the same as was described for the operation of the embodiment shown in FIG. 1.

FIG. 3 shows a circuit similar to that shown in FIG. 2 in which the periodic voltage source 8 is a sawtooth wave generator comprising a gaseous tube 9, such as a neon tube, capacitors 10 and 11, and a resistance 12. Again, as in FIG. 2, the charging capacitor 1 also serves to couple periodic voltage source 8 to input terminal 4. The operation of the circuit is the same as that previously described.

While the invention has thus been described and several embodiments shown, it is not limited to these particular shown embodiments, but instead many modifications will be apparent to those skilled in the art which will lie within the spirit and scope of the invention. For example, the invention is not limited to any particular periodic voltage source nor to any particular voltage wave shape therefrom. Likewise, the invention is not limited to the use of a neon tube, but instead, any device may be used which has a differential between its firing potential and its extinction potential. It is intended that the invention be limited in scope only by the appended claims.

What I claim as new and desire to secure by Letters Patent of the United States is:

1. A circuit for measuring an electric current comprising a capacitance, a series circuit comprising a gaseous discharge tube and a resistance connected in parallel with said capacitance, a periodic voltage source connected in parallel with said series circuit, said periodic voltage source providing a periodic voltage across said discharge tube, said periodic voltage having an amplitude which is small relative to the firing potential of said gaseous discharge tube and a frequency higher than the firing frequency of said gaseous discharge tube, means for supply a current to be measured across said series circuit, and means for measuring the frequency of output pulses appearing across said resistance.

2. A circuit in accordance with claim 1 in which said periodical voltage source comprises a sawtooth wave generator.

3. A circuit according to claim 1 in which said periodic voltage source comprises a sinusoidal wave generator.

4. A circuit according to claim 1 in which said periodic voltage source comprises a generator of rectangular pulses.

5. A circuit for converting a unidirectional current into a series of pulses, the frequency of which is indicative of the magnitude of said current comprising a first series circuit of a capacitor and a periodic voltage source, a second series circuit of gaseous discharge device and a resistance, said first and second series circuits being connected in parallel, said periodic voltage source providing a periodic voltage across said discharge tube, said periodic voltage having an amplitude which is small relative to the firing voltage of said gaseous discharge tube and a frequency higher than the firing frequency of said gaseous discharge tube, means for supplying a current to be measured across said second series circuit, and means to measure the frequency of output pulses occurring across said resistor.

6. A circuit according to claim 5 in which said periodic voltage source comprises a sawtooth wave generator.

7. A circuit according to claim 5 in which said periodic voltage source comprises a sinusoidal wave generator.

8. A circuit according to claim 5 in which said periodic voltage source comprises a generator of rectangular pulses.

References Cited by the Examiner
UNITED STATES PATENTS

| | | | |
|---|---|---|---|
| 2,457,125 | 12/48 | Chatterjea | 315—241 |
| 2,525,046 | 10/50 | Richter | 324—78 |
| 2,735,947 | 2/56 | Molloy | 324—122 |

WALTER L. CARLSON, *Primary Examiner.*
BENNETT G. MILLER, FREDERICK M. STRADER,
*Examiners.*